J. E. MUHLFELD.
JOURNAL BEARING.
APPLICATION FILED FEB. 13, 1909.
992,378.
Patented May 16, 1911.
3 SHEETS—SHEET 1.
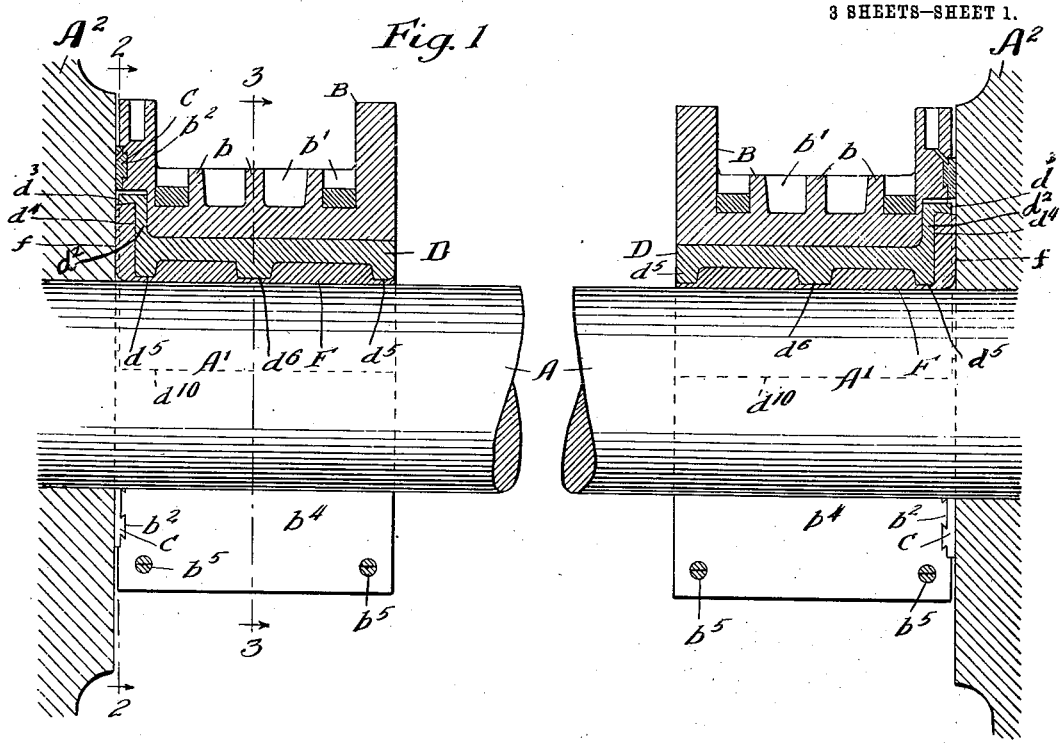
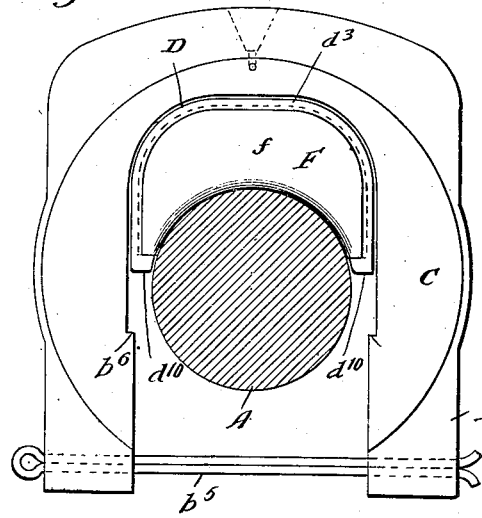
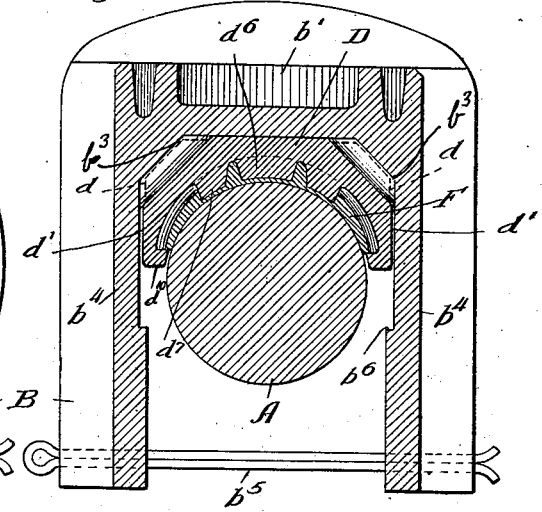
Witnesses:
Wm. Geiger
H. W. Munday.
Inventor:
John E. Muhlfeld
By Munday, Evarts, Adcock & Clarke.
Attorneys

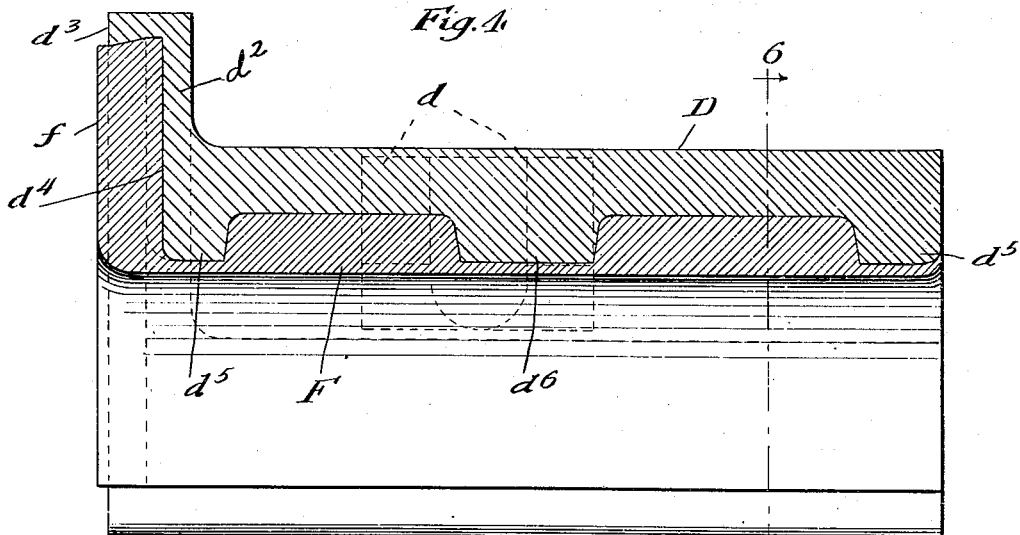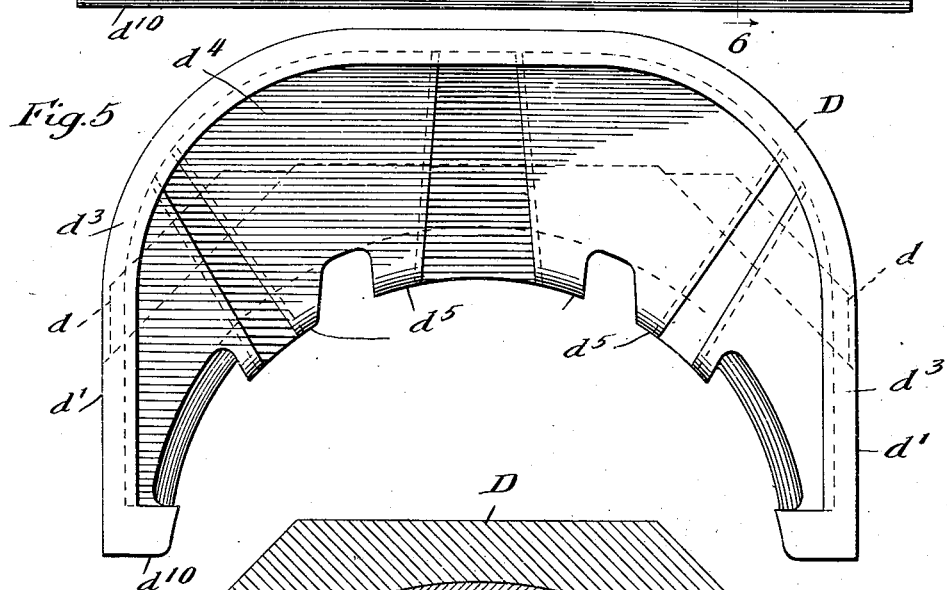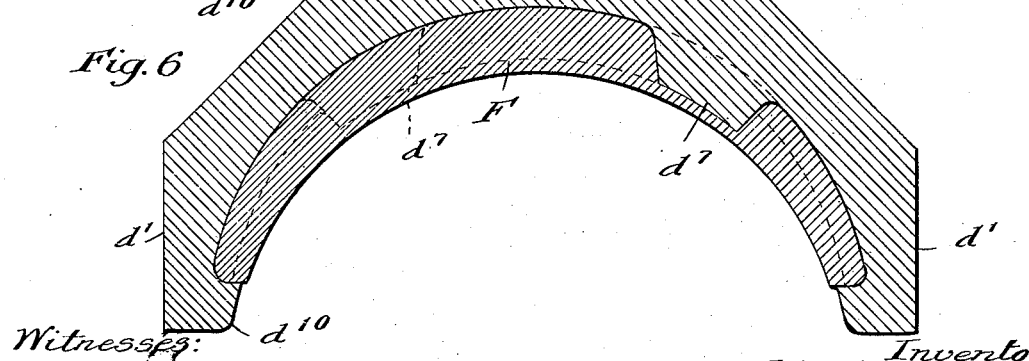

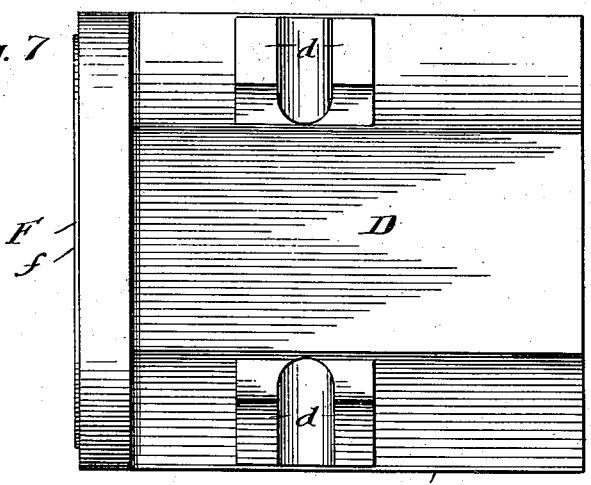
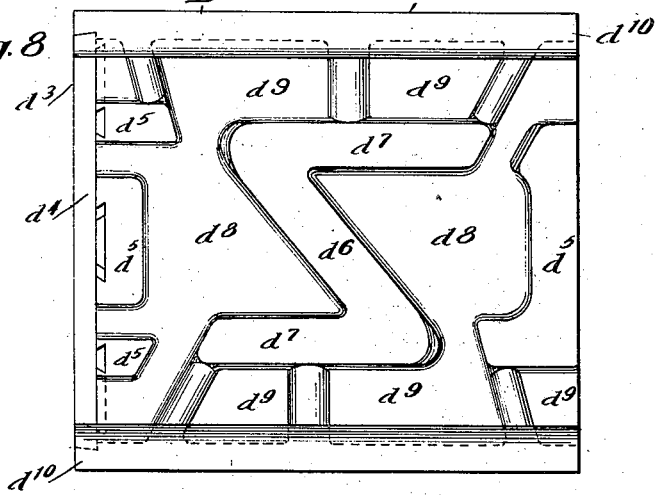
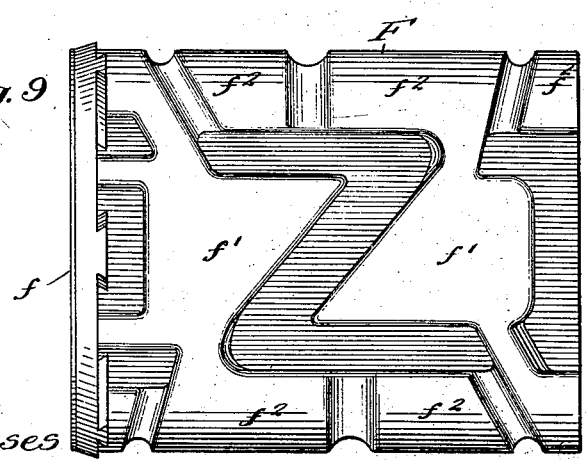

UNITED STATES PATENT OFFICE.

JOHN E. MUHLFELD, OF BALTIMORE, MARYLAND.

JOURNAL-BEARING.

992,378.  Specification of Letters Patent.  Patented May 16, 1911.

Application filed February 13, 1909. Serial No. 477,717.

*To all whom it may concern:*

Be it known that I, JOHN E. MUHLFELD, a citizen of the United States, residing in Baltimore, State of Maryland, have invented a new and useful Improvement in Journal-Bearings, of which the following is a specification.

My invention relates to improvements in journal bearings for steam, electric, compressed air and other locomotives or motors where the journals are placed or located inside the wheels or between the driver and truck wheels, and where the hub of the wheel may bear against one end face of the bearing.

Heretofore in journal bearings of the kind to which my invention relates, or where the journal is inside the wheel, it has been the general practice to force by pressure or cast, the members or crown bearing into the box or main shell that connects with the car or truck framework; and then in order to take up the end play and wear, the box or main shell must be removed from the axle, this in turn necessitating the removal of the wheels and axle from the framework.

The object of my invention is to provide a simple, efficient and durable construction of journal bearing suitable for use on locomotives or other vehicles where the journals are inside the wheels, and by which the difficulties or objections heretofore experienced may be overcome, and which will enable the wear and end play to be taken up without removing the box or main shell from the axle or the wheels and axle from the truck or car frame-work.

My invention consists in the novel construction of parts and devices, and in the novel combinations of parts and devices by which this object or result is accomplished, as herein shown and described and more particularly specified in the claims.

In the accompanying drawing forming a part of this specification, Figure 1 is a central vertical section of a pair of journal bearings embodying my invention, as applied to a steam locomotive axle or other axle having journals inside the wheels. Figs. 2 and 3 are vertical sections on lines 2—2 and 3—3 of Fig. 1. Fig. 4 is a detail central longitudinal section of the brass or crown bearing shell and its soft metal lining. Fig. 5 is a detail end elevation of the brass or crown bearing shell, and Fig. 6 is a cross section on line 6—6 of Fig. 4. Fig. 7 is a detail plan view. Fig. 8 is a detail bottom plan view of the crown bearing shell before the soft metal lining shell is applied thereto, and Fig. 9 is a detail top or plan view of the soft metal lining shell as it would appear with the crown bearing shell removed therefrom.

In the drawing, A represents the steam locomotive or other axle having its journals $A^1$ inside its wheels or drivers $A^2$.

B is the main shell or box of the journal bearing, the same having on its upper face suitable lugs or flanges $b$, and sockets or cavities $b^1$ for receiving and interfitting with the truck or other framework carried by the wheels and axle. This main shell or box B is provided on its outer upright face with recesses $b^2$ to receive a brass or other wearing or facing plate or ring C, and also on its under face with cavities or recesses $b^3$ to receive interfitting lugs $d$ of the crown bearing shell D which is made of brass or other hard, strong bearing metal, and which loosely fits within the box or main shell B. The upright sides or walls $b^4$ of the box or main shell B embrace the outer upright sides or walls $d^1$ of the crown bearing shell D. This crown bearing shell D is furnished at its outer end with an upwardly projecting end play shoulder or flange $d^2$ having an outwardly projecting flange $d^3$ forming an annular recess or channel $d^4$ to receive the end play shoulder $f$ of the soft metal lining shell F. The crown bearing shell D is further provided on its under face with transverse bearing ribs $d^5$, a diagonally extending intermediate transverse bearing rib $d^6$, longitudinally extending bearing ribs $d^7$ and cavities, depressions or channels $d^8$ $d^9$ between said bearing ribs to receive corresponding projections or thickened portions $f^1$ $f^2$ of the soft metal lining shell F.

The keys $b^5$ which extend under axle A or journal $A^1$ through the depending sides or walls $b^4$ of the box or main shell B are located sufficiently below the axle or journal to permit said box or main shell B to be jacked up sufficiently to enable the crown bearing shell D with its lining shell F to be removed from the box or main shell B and the journal without removing the box from the axle or the wheels and axle from the framework. The stop shoulders $b^6$ on the depending sides or walls $b^4$ of the box or main shell B are located sufficiently below the lower edges $d^{10}$ of the crown bearing shell D to permit of such removal.

When it is necessary to take up wear or end play in my improved journal bearing, this can be very readily and quickly and cheaply done by simply jacking up the box or main shell B and removing the crown bearing D and its soft metal lining F and replacing the same with a new one. And when the soft metal lining shell F is worn away either at the curved portion thereof which contacts with the journal or at the end play shoulder or flange *f* thereof, the crown bearing shell D can be relined or refaced with soft metal and the end play or other wear thus taken up without material cost, trouble or delay.

I claim:—

1. In a journal bearing for use on axles having journals inside the wheels, the combination with a main shell, having a wearing plate on its outer upright face, of a removable crown bearing shell separate from said wearing plate, said crown bearing shell and main shell having interfitting lugs and the crown bearing shell having at its outer end an end play flange furnished with a recess on its outer face, said main shell having inside its wear plate a recess to receive the end play flange of said crown bearing shell and a soft metal lining shell having an end play flange fitting in the recess of the end play flange of the crown bearing shell, said crown bearing shell having on its under face longitudinally and transversely extending bearing ribs, and said lining shell having thickened portions on its upper face interfitting with the bearing ribs of said crown bearing shell, substantially as specified.

2. In a journal bearing for axles having journals inside the wheels, the combination with a box or main shell having on its outer upright face a wearing plate, and provided at its outer end inside said wear plate with a recess to receive an end play flange, of a removable crown bearing shell having an end play flange separate from said wearing plate and fitting in said channel of the box and provided with a recess to receive an end play flange, and provided on its under face with bearing ribs, and a soft metal lining shell having an end play flange or shoulder fitting in the recess of the end play flange of the crown bearing shell, substantially as specified.

3. The combination with a wheel and an axle having a journal inside the wheel, of a box having a wearing plate on its outer upright face, a removable crown bearing shell interfitting with the box and having at its outer end an end play flange separate from said wearing plate, the box having a recess inside said wear plate to receive said flange, and said flange having a recess to receive a lining flange, said crown bearing shell having on its under face bearing ribs, and a soft metal lining shell fitting the under face of said crown bearing shell and having an end play flange fitting in the recess of the end play flange of the crown bearing shell, substantially as specified.

4. In a journal bearing for use on axles having journals inside the wheels, the combination with a main shell having a wearing plate on its outer upright face, of a removable crown bearing shell, said crown bearing shell and main shell having interfitting lugs and the crown bearing shell having at its outer end an end play flange separate from said wearing plate and furnished with a recess on its outer face, said main shell having inside its wear plate a recess to receive the end play flange of said crown bearing shell and a soft metal lining shell having an end play flange fitting in the recess of the end play flange of the crown bearing shell, said crown bearing shell having on its under face longitudinally and transversely extending bearing ribs, and said lining shell having thickened portions on its upper face interfitting with the bearing ribs of said crown bearing shell, a wheel having an inner upright face engaging said end play flange of the lining shell and an axle having a journal inside said wheel, substantially as specified.

5. In a journal bearing for axles having journals inside the wheels, the combination with a box or main shell having on its outer upright face a wearing plate, and provided at its outer end inside said wear plate with a recess to receive an end play flange, of a removable crown bearing shell having an end play flange separate from said wearing plate and fitting in said channel of the box and provided with a recess to receive an end play flange, and provided on its under face with bearing ribs, and a soft metal lining shell having an end play flange or shoulder fitting in the recess of the end play flange of the crown bearing shell, a wheel having an inner upright face engaging said end play flange of the lining shell and an axle having a journal inside said wheel, substantially as specified.

JOHN E. MUHLFELD.

Witnesses:
H. H. HOUCK,
JOHN B. MCGRAW.